US005884858A

United States Patent [19]
Woo

[11] Patent Number: 5,884,858
[45] Date of Patent: Mar. 23, 1999

[54] REEL TABLE DRIVING MECHANISM FOR A VIDEO CASSETTE RECORDER

[75] Inventor: Ji-Sung Woo, Seoul, Rep. of Korea

[73] Assignee: Daewoo Electronics Co., Ltd., Seoul, Rep. of Korea

[21] Appl. No.: 920,859

[22] Filed: Aug. 29, 1997

[30] Foreign Application Priority Data

Aug. 31, 1996 [KR] Rep. of Korea .................. 1996 37647

[51] Int. Cl.$^6$ ................................................. G11B 15/32
[52] U.S. Cl. ...................................... 242/356.5; 360/96.4
[58] Field of Search ................................ 242/356.5, 356; 360/96.4, 96.3

[56] References Cited

U.S. PATENT DOCUMENTS 4,709,871  12/1987  Tanaka ................................... 242/356.5
5,230,483   7/1993  Kang ..................................... 242/356.5

FOREIGN PATENT DOCUMENTS 1 585 084   2/1981  United Kingdom .

Primary Examiner—John Q. Nguyen
Attorney, Agent, or Firm—Pillsbury Madison & Sutro, LLP

[57] ABSTRACT

A reel table driving mechanism for a video cassette recorder which can transmit drive forces of different torques to a supply reel table and a take-up reel table in accordance with operating modes thereof. The reel table driving mechanism has a first rotator having a supporting shaft, a pulley rotatably inserted around a lower portion of the supporting shaft, a felt interposed between the pulley and the first rotator, a spring holder disposed on an upper surface of the pulley, a movable member slidably coupled to an upper portion of the spring holder, a spring disposed between the movable member and the spring holder, and a second rotator disposed on an upper portion of the movable member. The movable member is formed at an upper surface thereof with three first vertical sections and three first inclined sections. The movable member is formed at an underside thereof with a pair of extension members which are slidably engaged with the pair of guide grooves of the spring holder. The second rotator is formed at an inner lower portion thereof with a recess which is engaged with the upper surface of the movable member. The second rotator pushes the movable member downward when it is rotated in a reverse direction. By the mechanism, a tape is stably run while various operating modes are being executed.

11 Claims, 5 Drawing Sheets

REEL TABLE DRIVING MECHANISM FOR A VIDEO CASSETTE RECORDER

BACKGROUND OF THE INVENTION

1. Field of the Invention

The present invention relates to a video cassette recorder, and more particularly to a reel table driving mechanism for a video cassette recorder which can transmit drive forces of different torques to a supply reel table and a take-up reel table in accordance with operating modes thereof.

2. Prior Art

Generally, a video cassette recorder (hereinafter, simply referred to VCR) is a device for recording/reproducing an image signal and an audio signal onto/from a magnetic tape running along a running system. The magnetic tape is wound around a pair of reels provided in a cassette. When the cassette is loaded into a deck of the VCR according to a loading mechanism, the pair of reels are respectively mounted on a take-up reel table and a supply reel table installed on the deck. After that, the take-up reel table and the supply reel table are rotated by a capstan motor, thereby carrying out selected operating modes such as play, record, fast forward and rewind. At this time, the magnetic tape is drawn out from one reel and is wound around the other reel according to the rotating directions of the take-up reel table and the supply reel table.

A typical reel disc driving system of a conventional VCR 500 is schematically shown in FIG. 5, wherein a tape 501 may be made to travel in a forward or a reverse direction by the drive of a supply reel table 510 or a take-up reel table 520. Further, tape 501 can be made to travel at a constant speed by means of a capstan shaft 550 and a pinch roller 540. In general, reel tables 510 and 520 are selectively driven by an idler 560 for transmitting the driving force of a capstan motor 530.

Idler 560 is selectively engaged with supply reel table 510 or take-up reel table 520 according to a rotating direction of capstan motor 530 so that supply reel table 510 or take-up reel table 520 can be selectively rotated. However, looseness of loaded magnetic tape 501 may occur during the conversion from one mode to another mode of operation due to a delay in the shifting motion of idler 560 and an inertia moment of reel tables 510 and 520, which may cause operational failures, noises and/or distortions.

Therefore, take-up reel table 520 requires relatively less torque for running magnetic tape 501 in the forward direction because it is disposed closer to capstan motor 530, whereas supply reel table 510 requires relatively more torque for moving magnetic tape 501 in the reverse direction because it is disposed farther from capstan motor 530.

Moreover, in case of the rewind or fast forward modes wherein magnetic tape 501 is run at a higher speed, a higher level of torque is required for rotating reel tables 510 and 520. Such requirements for varying the torque of each reel table are normally executed by means of a reel disc driving mechanism.

FIG. 6 shows a conventional reel table driving mechanism 300 for VCR 500. As shown in FIG. 6, reel table driving mechanism 300 comprises a first rotator 12 rotatably mounted to a support shaft 14 which is secured to a deck. a driving pulley 18 rotatably inserted around a hub 13 of first rotator 12 and in contact with first rotator 12 through a felt member 34, and a second rotator 22 firmly fitted on hub 13 of first rotator 12. A movable member 20 is coupled to second rotator 22 so that it is selectively engaged with openings 32 of driving pulley 18 so as to directly transmit the drive force of pulley 18 to second rotator 22.

In addition, seated at second rotator 22 is a spring 24 which can bias movable member 20 upward to separate it from openings 32 of driving pulley 18, thereby transmitting the driving force of pulley 18 to first rotator 12 through felt member 34.

A driving gear 10 is rotatably inserted around hub of first rotator 12 and meshed with idler 560. Also, disposed between second rotator 22 and driving gear 10 is a spring 26 which pushes driving gear 10 upward to properly engage it with idler. Pulley 18 is rotated clockwise or counterclockwise through a belt 30 coupled thereto, depending on a forward or a reverse driving of capstan motor 530.

In the case of a play or a review mode, movable member 20 is kept separated from pulley 18. Therefore, the driving force of pulley 18 is transmitted to first rotator 12 due to the frictional contact therebetween via felt member 34, providing driving gear 10 with relatively less torque through second rotator 22 and spring 26. As a result, idler 560 is shifted toward and engaged with one of reel tables 510 and 520, thereby operating VCR 500 in a desired mode. When an excess load is exerted against driving gear 10 during an operation of VCR 500, a slippage between pulley 18 and first rotator 12 occurs, preventing loaded tape 501 from slackening.

In the case of a rewind mode or a fast forward mode, movable member 20 is pressed downward against the biasing force of spring 24 by a pressing member (not shown) and then engaged with driving pulley 18 through openings 32 of pulley 18. Therefore, pulley 18 and second rotator 22 are rotated together with first rotator 12. Accordingly, the driving force of pulley 18 is directly transmitted to gear 10 to generate a higher torque for each reel table, enabling VCR 500 to operate in the rewind or fast forward operating mode.

However, while the play mode or the review mode is being carried out, conventional reel table driving mechanism 300 transmits the same torque to supply reel table 510 or take-up reel table 520 so that the looseness or slackening of the loaded magnetic tape may occur while the above modes are executed.

SUMMARY OF THE INVENTION

The present invention has been made to solve the problem of the prior art, and accordingly, it is an object of the present invention to provide a reel table driving mechanism for a VCR which can transmit drive forces of different torques to a supply reel table and a take-up reel table in accordance with various operating modes thereof.

To accomplish the above object of the present invention, there is provided a reel table driving mechanism for a VCR, the reel table driving mechanism comprising:

a first rotator having a first disc member and a supporting shaft integrally formed at a center of an upper surface of the first disc member;

a pulley connected to a capstan motor through a belt, the pulley being rotatably inserted around a lower portion of the supporting shaft;

a means for transmitting a rotational force of the pulley to the first rotator;

a spring holder concentrically disposed on an upper surface of the pulley and inserted around the supporting shaft while maintaining a first predetermined distance therebetween;

a movable member slidably coupled to an upper portion of the spring holder and inserted around the supporting shaft while maintaining a second predetermined distance therebetween, the movable member being moved up and down along the spring holder;

a spring disposed between the movable member and the spring holder;

a second rotator disposed on an upper portion of the movable member and securely inserted around the supporting shaft, the second rotator being engaged with the movable member when the second rotator is rotated in a first direction, the second rotator pushing the movable member downwards when the second rotator is rotated in a second direction which is opposite to the first direction; and a driving gear securely inserted around the second rotator so as to be rotated together with the second rotator, the driving gear being engaged with an idler.

According to a preferred embodiment of the present invention, the means for transmitting the rotational force of the pulley to the first rotator includes a felt interposed between an underside of the pulley and the upper surface of the first disc member of the first rotator.

The spring holder is formed at an upper part thereof with a pair of guide grooves for guiding a sliding movement of the movable member. The movable member has a hollow cylindrical shape and is formed at an upper surface thereof with three first vertical sections and three first inclined sections which are alternately provided. The movable member is integrally formed at an underside thereof with a pair of extension members which are slidably engaged with the pair of guide grooves of the spring holder.

The second rotator has a cylindrical shape and is concentrically disposed with the movable member. The second rotator is formed at an inner lower portion thereof with a recess which is engaged with the upper surface of the movable member. The recess is defined by three second vertical sections which make contact with the three first vertical sections respectively and by three second inclined sections which make contact with the three first inclined sections.

Three first protrusions are provided at an upper outer wall of the movable member and three second protrusions are provided at an outer wall of the recess. The first protrusions are disposed in positions adjacent to the three first vertical sections respectively, and the second protrusions make contact with the first protrusions when the second rotator is rotated by a predetermined angle in the second direction, thereby preventing a downward movement of the movable member.

The reel table driving mechanism having the above construction operates as follow.

Firstly, in case of a play mode, the capstan motor rotates in the first direction so as to transmit the driving force to the pulley. Then, the driving force of the capstan motor is transmitted to the first rotator through the felt, thereby rotating the first rotator in the first direction.

As the first rotator rotates in the first direction, the second rotator securely coupled to the upper portion of the supporting shaft also rotates in the first direction. When the second rotator rotates in the first direction, the second vertical sections of the recess push the first vertical sections of the movable member so that the movable member does not move downward. Accordingly, a normal torque is transmitted to the take-up table through the driving gear and the idler, enabling the VCR to operate in the play mode.

In the case of a review mode, the capstan motor rotates in the second direction. The driving force of the capstan motor is transmitted to the first rotator through the pulley and the felt, thereby rotating the first rotator in the second direction.

As the first rotator rotates in the second direction, the second rotator securely coupled to the upper portion of the supporting shaft also rotates in the second direction. When the capstan motor rotates in the second direction, the movable member is moved downward.

By the downward movement of the movable member, the spring disposed between the movable member and the spring holder is biased downward. The bias force of the spring is transmitted to the pulley, so the frictional force between the pulley and the felt increases.

As a result, a higher torque is transmitted to the supply reel table through the driving gear and the idler, enabling the VCR to operate in the review mode.

As described above, the reel table driving mechanism of the present invention can transmit drive forces of different torques to a supply reel table or a take-up reel table in accordance with various operating modes thereof so that the magnetic tape runs stably while the various operating modes are being executed.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Hereinafter, the preferred embodiment of the present invention will be explained in detail with reference to the accompanying drawings.

Figure 1:
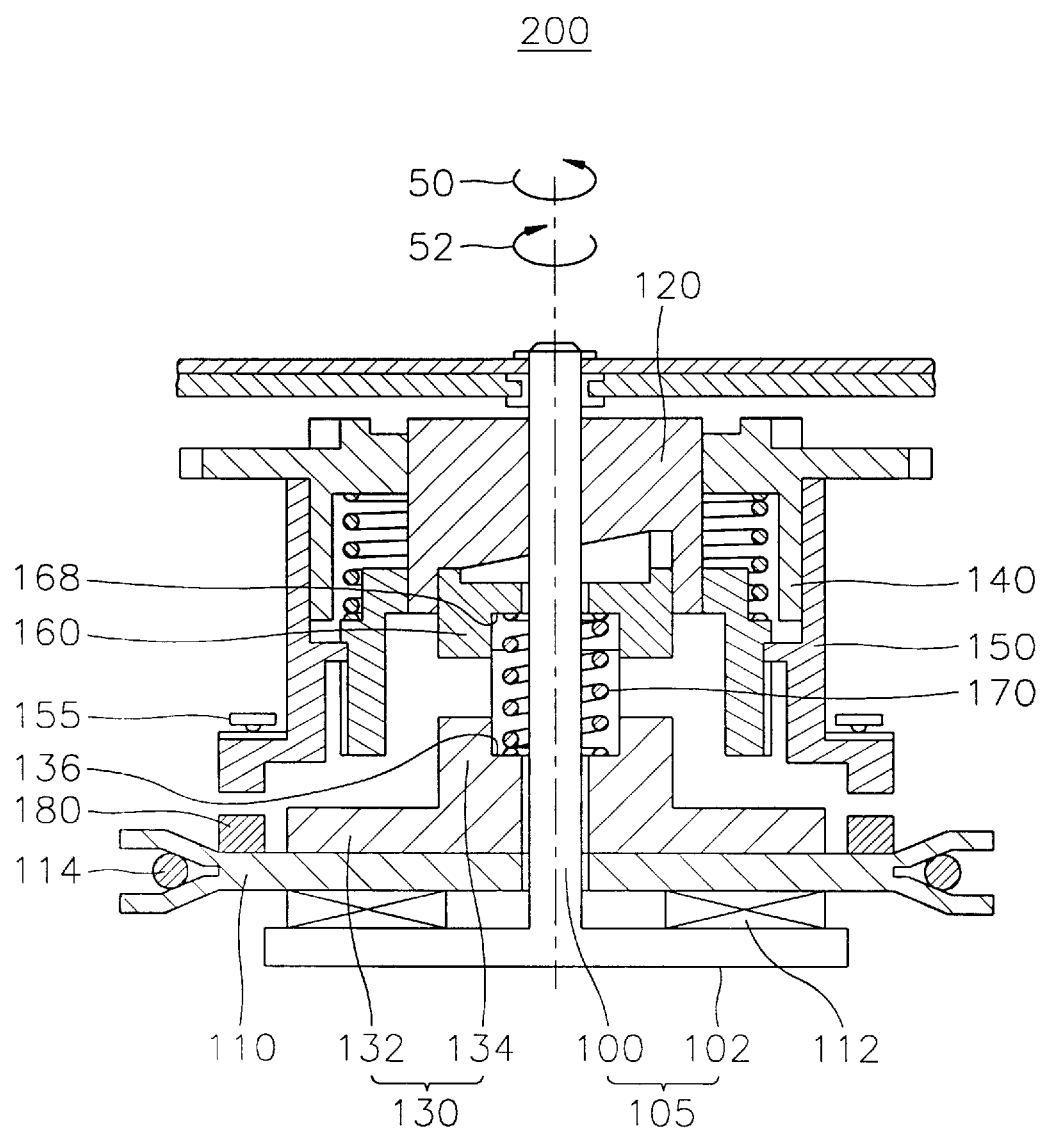
FIG. 1 is a sectional view showing a reel table driving mechanism for a VCR according to one embodiment of the present invention.

FIG. 1 shows a reel table driving mechanism 200 for a VCR. As shown in FIG. 1, the reel table driving mechanism 200 comprises a first rotator 105 having a first disc member 102 and a supporting shaft 100 integrally formed at a center of an upper surface of first disc member 102. A pulley 110 connected to a capstan motor (not shown) through a belt 114 so as to receive a driving force from the capstan motor is rotatably inserted around a lower portion of the supporting shaft 100.

A felt 112 for transmitting a rotational force of pulley 110 to first rotator 105 is interposed between an underside of pulley 110 and an upper surface of first disc member 102 of first rotator 105. At an upper surface of pulley 110, there is installed a spring holder 130 which is concentrically disposed with pulley 110 and is inserted around supporting shaft 100 while maintaining a predetermined distance from supporting shaft 100. According to another embodiment of the present invention, a felt for transmitting the rotational force of pulley 110 to spring holder 130 is interposed between an underside of spring holder 130 and the upper surface of pulley 110. In this case, the frictional coefficient of the felt interposed between the underside of spring holder 130 and the upper surface of pulley 110 should be less than the frictional coefficient of felt 112 interposed between pulley 110 and first rotator 105.

Figure 3:
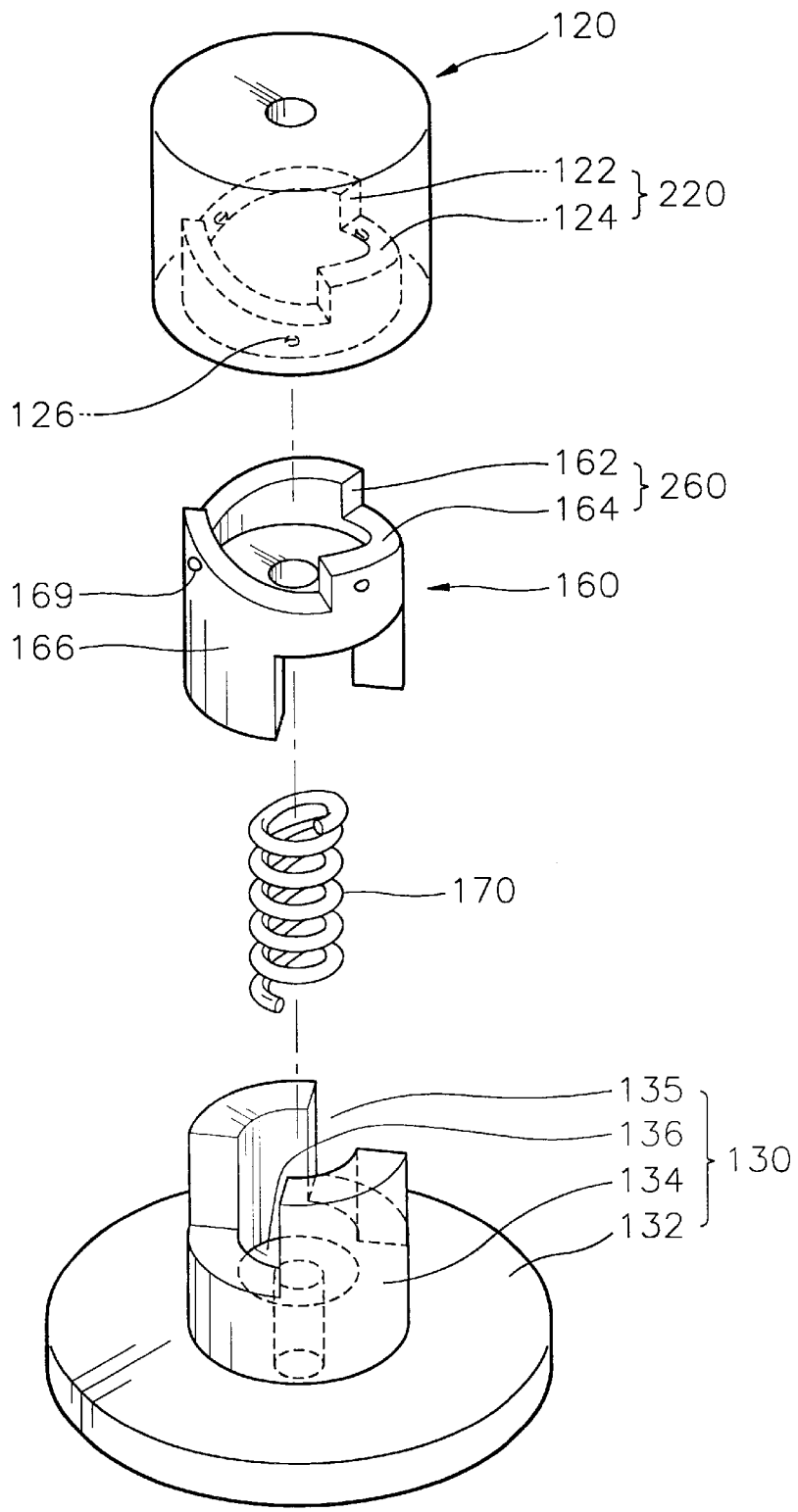
FIG. 3 is an exploded perspective view showing main elements of a reel table driving mechanism for a VCR according to the present invention.

Referring to FIG. 3, spring holder 130 includes a second disc member 132 disposed on the upper surface of pulley 110 and a hollow cylindrical portion 134 integrally formed with a center of an upper surface of second disc member 132. Hollow cylindrical portion 134 is formed at an upper part thereof with a pair of guide grooves 135 which are in opposition to each other. In addition, a first spring seat 136 is provided in hollow cylindrical portion 134 of spring holder 130.

Referring again to FIG. 1, a movable member 160 is slidably coupled to an upper portion of spring holder 130. Movable member is concentrically disposed with spring holder 130 and is inserted around supporting shaft 100 while maintaining a predetermined distance from supporting shaft 100. Movable member 160 is moved up and down along spring holder 130. Movable member 160 has an outer diameter identical to an outer diameter of hollow cylindrical portion 134 of the spring holder 130.

As shown in FIG. 3 in detail, movable member 160 has a hollow cylindrical shape and is formed at an upper surface 260 thereof with three first vertical sections 162 and three first inclined sections 164 which are alternately provided. Movable member 160 is also integrally formed at an underside thereof with a pair of extension members 166 which are slidably engaged with the pair of guide grooves 135 of spring holder 130. According to a preferred embodiment of the present invention, the three first vertical sections 162 have the same heights, and the three first inclined sections 164 have the same lengths.

In addition, a second spring seat 168 is provided in movable member 160. Disposed between a first spring seat 136 of spring holder 130 and second spring seat 168 of movable member 160 is a spring 170 for elastically supporting both spring holder 130 and movable member 160.

Figure 2:
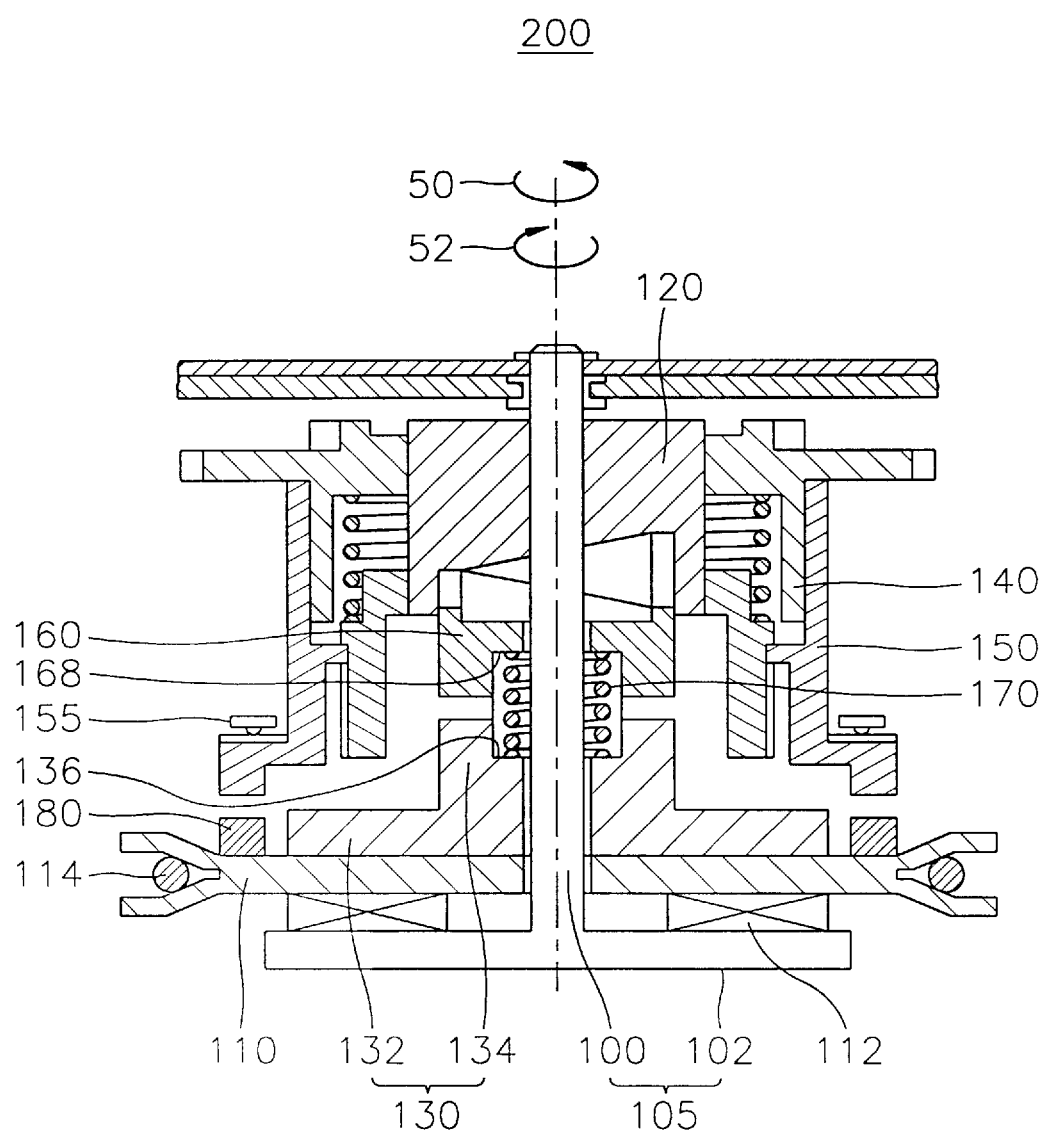
FIG. 2 is a sectional view of a reel table driving mechanism in which a movable member is moved downward.

Referring to FIG. 1, a second rotator 120 is concentrically disposed on an upper portion of movable member 160. Second rotator 120 is securely inserted around the upper portion of supporting shaft 100. Second rotator 120 is engaged with movable member 160 when it is rotated in a first direction, and as shown in FIG. 2, second rotator 120 pushes movable member 160 downward by a predetermined distance when it is rotated in a second direction which is opposite to the first direction.

As shown in FIG. 3 in detail, second rotator 120 has a cylindrical shape and is concentrically disposed with movable member 160. Second rotator 120 is formed at an inner lower portion thereof with a recess 220 which is engaged with upper surface 260 of movable member 160. Recess 220 is defined by three second vertical sections 122 which make contact with the three first vertical sections 162, and by three second inclined sections 124 which make contact with the three first inclined sections 164.

According to the preferred embodiment of the present invention, first inclined sections 164 have widths smaller than widths of second inclined sections 124. In addition, three first protrusions 169 are provided at an upper outer wall of movable member 160 and three second protrusions 126 are provided at an outer wall of recess 220. First protrusions 169 are disposed in positions adjacent to the three first vertical sections 162. Second protrusions 126 make contact with first protrusions 169 when second rotator 120 is rotated at a predetermined angle in the second direction, thereby preventing a downward movement of movable member 160.

Referring again to FIG. 1, a driving gear 140 is securely inserted around second rotator 120 so as to be rotated together with second rotator 120. Driving gear 140 is engaged with an idler (not shown) so that the driving force of the capstan motor is transferred to the idler. As is well known, the idler is selectively engaged with a supply reel table or a take-up reel table according to the rotational direction of the capstan motor, thereby selectively transferring the driving force of the capstan motor to the supply reel table or the take-up reel table.

On the other hand, a clutch 150 is inserted around a lower portion of driving gear 140. In the case of a rewind mode or a fast forward mode, clutch 150 is moved downward by a pressing member 155 so that a rib 180 is forced downward, thereby transmitting more torque to the supply reel table or the take-up reel table.

Reel table driving mechanism 200 having the above construction operates as follow.

Firstly, in the case of a play mode, the capstan motor rotates in the first direction, that is a forward direction, as indicated by an arrow 50 in FIG. 1. The driving force of the capstan motor is transmitted to pulley 110 through belt 114. Then, the driving force of the capstan motor is transmitted to first rotator 105 through felt 112 disposed between pulley 110 and first disc member 102 of first rotator 105, thereby rotating first rotator 105 in the first direction.

At this time, a slippage may occur between pulley 110 and first disc member 102 so that the driving force of the capstan motor is not fully transmitted to first rotator 105.

As first rotator 105 rotates in the first direction, second rotator 120 securely coupled to the upper portion of supporting shaft 100 also rotates in the first direction. When second rotator 120 rotates in the first direction, second vertical sections 122 of recess 220 push first vertical sections 162 of movable member 160 so that movable member 160 does not move downward.

Accordingly, a normal torque is transmitted to the take-up table through driving gear 140 and the idler, enabling the VCR to operate in the play mode.

On the other hand, in the case of a review mode, the capstan motor rotates in the second direction, that is a reverse direction, as indicated by an arrow 52 in FIG. 1. Similar to the case of the play mode, the driving force of the capstan motor is transmitted to pulley 110 through belt 114. Then, the driving force of the capstan motor is transmitted to first rotator 105 through felt 112 disposed between pulley 110 and first disc member 102 of first rotator 105, thereby rotating first rotator 105 in the second direction.

Figure 4:
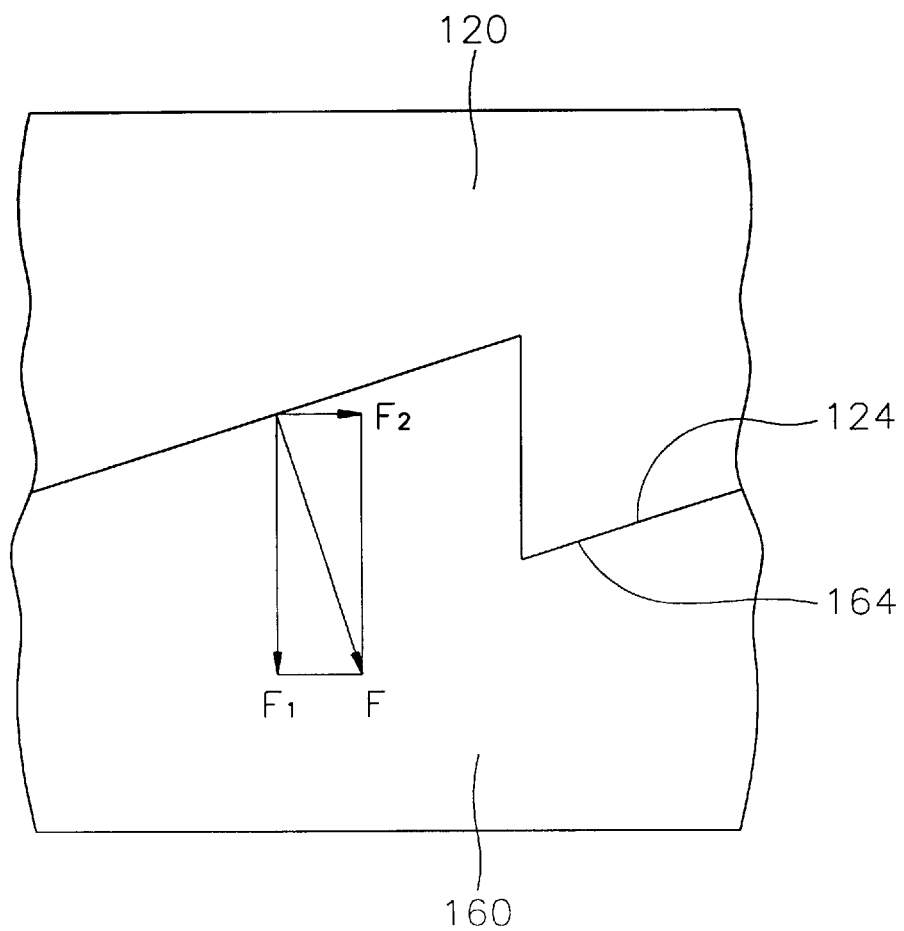
FIG. 4 is a view showing directions of component forces based on a rotational force applied to a movable member.
Figure 5:
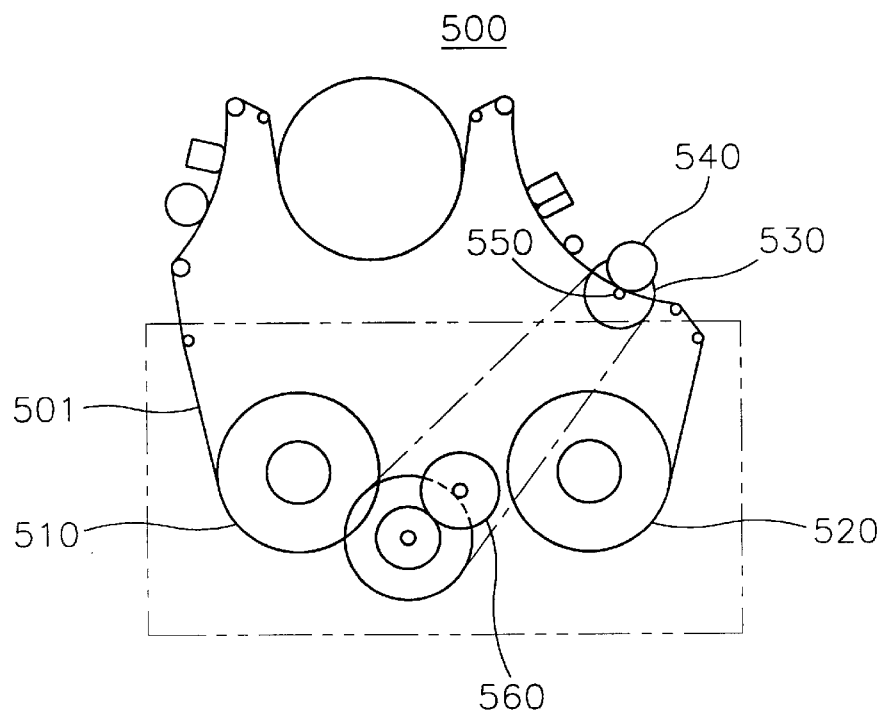
FIG. 5 is a schematic view showing the structure of a conventional VCR.
Figure 6:
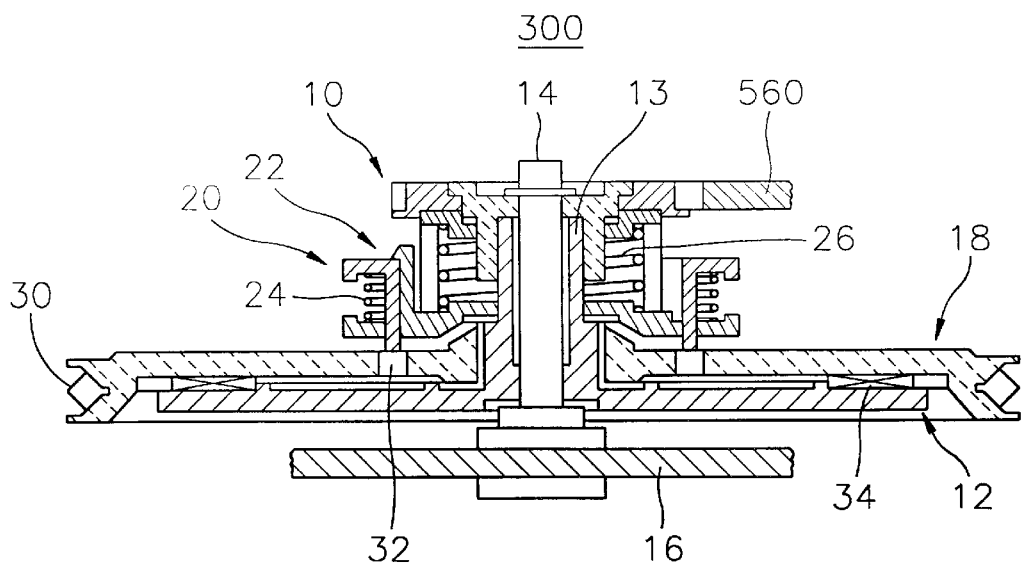
FIG. 6 is a sectional view showing a reel table driving mechanism for a conventional VCR.

As first rotator 105 rotates in the second direction, second rotator 120 securely coupled to the upper portion of supporting shaft 100 also rotates in the second direction. As shown in FIG. 4, when second rotator 120 rotates in the second direction, second inclined sections 124 of recess 220 push first inclined sections 164 of movable member 160 so that a force F is applied to movable member 160 by second rotator 120. Force F is divided into a first component force F1 and a second component force F2.

Accordingly, movable member 160 is moved downwardly as shown in FIG. 2. That is, extension members 166 of movable member 160 are moved downward along guide grooves 135 of spring holder 130. However, when second rotator 120 is rotated at a predetermined angle in the second direction, first protrusions 169 formed at the outer wall of movable member 160 make contact with second protrusion 126 formed in recess 220 so that movable member 160 is not moved further downward.

By the downward movement of movable member 160, spring 170 disposed between movable member 160 and spring holder 130 is biased downward. The bias force of spring 170 is transmitted to pulley 110 through spring holder 130, so the frictional force between pulley 110 and felt 112 increases.

As a result, a higher torque is transmitted to the supply reel table through first rotator 105, second rotator 120, driving gear 140, and the idler, enabling the VCR to operate in the review mode.

In the case of a fast forward mode or rewind mode, clutch 150 is moved downward by a pressing member 155 so that rib 180 is urged downward. Accordingly, the frictional force between pulley 110 and felt 112 further increases so that a larger torque is applied to the take-up reel table or the supply reel table.

As described above, the reel table driving mechanism of the present invention can transmit drive forces of different torques to a supply reel table or a take-up reel table in accordance with various operating modes thereof so that the magnetic tape is stably run while the various operating modes are being executed.

Although the preferred embodiment of the invention has been described, it will be understood by those skilled in the art that the present invention should not be limited to the described preferred embodiment, but various changes and modifications can be made within the spirit and scope of the invention as defined by the appended claims.

What is claimed is:

1. A reel table driving mechanism for a VCR, the reel table driving mechanism comprising:

a first rotator having a first disc member and a supporting shaft integrally formed at a center of an upper surface of the first disc member;

a pulley connected to a capstan motor through a belt, the pulley being rotatably inserted around a lower portion of the supporting shaft;

a means positioned between the pulley and the first disc member for transmitting a rotational force of the pulley to the first rotator;

a spring holder concentrically disposed on an upper surface of the pulley and inserted around the supporting shaft while maintaining a first predetermined distance from the supporting shaft;

a movable member slidably coupled to an upper portion of the spring holder and inserted around the supporting shaft while maintaining a second predetermined distance from the supporting shaft, the movable member being movable up and down along the spring holder;

a spring disposed between the movable member and the spring holder;

a second rotator disposed on an upper portion of the movable member and securely inserted around the supporting shaft to rotate integrally with the supporting shaft, the second rotator being structured to engage with the movable member when the second rotator is rotated in a first direction, the second rotator structured for pushing the movable member downward when the second rotator is rotated in a second direction which is opposite to the first direction; and a driving gear securely inserted around the second rotator so as to be rotated together with the second rotator, the driving gear being engaged with an idler.

2. The reel table driving mechanism as claimed in claim 1, wherein the means for transmitting the rotational force of the pulley to the first rotator includes a felt interposed between an underside of the pulley and the upper surface of the first disc member of the first rotator.

3. The reel table driving mechanism as claimed in claim 1, wherein the spring holder includes a second disc member disposed on the upper surface of the pulley and a hollow cylindrical portion integrally formed at a center of an upper surface of the second disc member, the hollow cylindrical portion being formed at an upper part thereof with a pair of guide grooves for guiding a sliding movement of the movable member, the pair of guide grooves being formed in opposition to each other.

4. The reel table driving mechanism as claimed in claim 3, wherein the movable member has a hollow cylindrical shape and is formed at an upper surface thereof with alternately provided three first vertical sections and three first inclined sections, the movable member being integrally formed at an underside thereof with a pair of extension members which are respectively slidably engaged with the pair of guide grooves of the spring holder.

5. The reel table driving mechanism as claimed in claim 4, wherein a first spring seat is provided in the hollow cylindrical portion of the spring holder, a second spring seat is provided in the movable member, and the spring is disposed between the first spring seat and the second spring seat.

6. The reel table driving mechanism as claimed in claim 4, wherein the three first vertical sections have identical heights, and the three first inclined sections have identical lengths.

7. The reel table driving mechanism as claimed in claim 4, wherein the movable member has a first outer diameter identical to a second outer diameter of the hollow cylindrical portion of the spring holder.

8. The reel table driving mechanism as claimed in claim 4, wherein the second rotator has a cylindrical shape and is concentrically disposed with the movable member, the second rotator being formed at an inner lower portion thereof with a recess which is engaged with the upper surface of the movable member, the recess being defined by three second vertical sections which are structured to make contact with the three first vertical sections and by three second inclined sections which are structured to make contact with the three first inclined sections.

9. The reel table driving mechanism as claimed in claim 8, wherein the three second vertical sections have identical heights, and the three second inclined sections have identical lengths.

10. The reel table driving mechanism as claimed in claim 8, wherein the first inclined sections have first widths which are smaller than the second widths of the second inclined sections.

11. The reel table driving mechanism as claimed in claim 10, wherein three first protrusions are provided at an upper outer wall of the movable member and three second protrusions are provided at an outer wall of the recess, the first protrusions being disposed in positions adjacent to the three first vertical sections, the second protrusions being structured to make contact with the first protrusions when the second rotator is rotated by a predetermined angle in the second direction, thereby limiting a downward movement of the movable member.

* * * * *